United States Patent [19]
Doolittle

[11] 3,976,265
[45] Aug. 24, 1976

[54] SEMIBUOYANT COMPOSITE AIRCRAFT

[75] Inventor: Donald B. Doolittle, Hockessin, Del.

[73] Assignee: All American Industries, Inc., Wilmington, Del.

[22] Filed: Dec. 23, 1974

[21] Appl. No.: 535,417

Related U.S. Application Data

[63] Continuation-in-part of Ser. No. 357,636, May 7, 1973, Pat. No. 3,856,236.

[52] U.S. Cl. .................................. 244/2; 244/26; 416/114; 416/156
[51] Int. Cl.² ........................................ B64C 37/02
[58] Field of Search ............... 244/2, 5, 17.11, 25, 244/26, 27, 28, 97; 416/114, 115, 156, 158

[56] References Cited
UNITED STATES PATENTS

| | | | |
|---|---|---|---|
| 1,682,961 | 9/1928 | Hall | 244/97 |
| 1,838,248 | 12/1931 | Bourland | 244/26 X |
| 2,427,939 | 9/1947 | Woods | 416/158 X |
| 2,861,640 | 11/1958 | DuPont | 416/156 |
| 3,096,047 | 7/1963 | Dunn | 244/97 X |
| 3,856,236 | 12/1974 | Doolittle | 244/2 |

FOREIGN PATENTS OR APPLICATIONS

| | | | |
|---|---|---|---|
| 191,445 | 1/1923 | United Kingdom | 244/26 |

*Primary Examiner*—Duane A. Reger
*Assistant Examiner*—Barry L. Kelmachter
*Attorney, Agent, or Firm*—Connolly and Hutz

[57] ABSTRACT

Various modifications are disclosed of the composite aircraft, which is the subject of U.S. Pat. No. 3,856,236 by this same inventor. The control console is supported from the center of the upper rotating balloon sphere instead of its south pole to reduce the periodic motion of the console about its point of attachment to the sphere. The console is supported from the center of an inner framework through a tapered indentation in the bottom of the sphere. A lift command control system determines the angle of attack of each wing about the periphery of the sphere to provide the force required to generate movement of the sphere in a preselected direction. If the wing experiences a gust, the force reaction compels the wing to seek a different angle of attack to keep the new force in balance with the command force exerted by the control on the wing to automatically provide gust control. A pneumatic lift command control system is illustrated. The altitude of the aircraft is controlled by maintaining the gas pressure at constant temperature by heat, such as obtained from the engine. Other variations for reducing drag include: boundary layer control of air pressure about the sphere to overcome the Magnus effect enclosing the sphere in an envelope, which does not rotate relative to the air, flattening the sphere and driving it by auxiliary engines instead of tilting it or by applying cone-shaped sections to one hemisphere and translating a substantially horizontal position.

8 Claims, 10 Drawing Figures

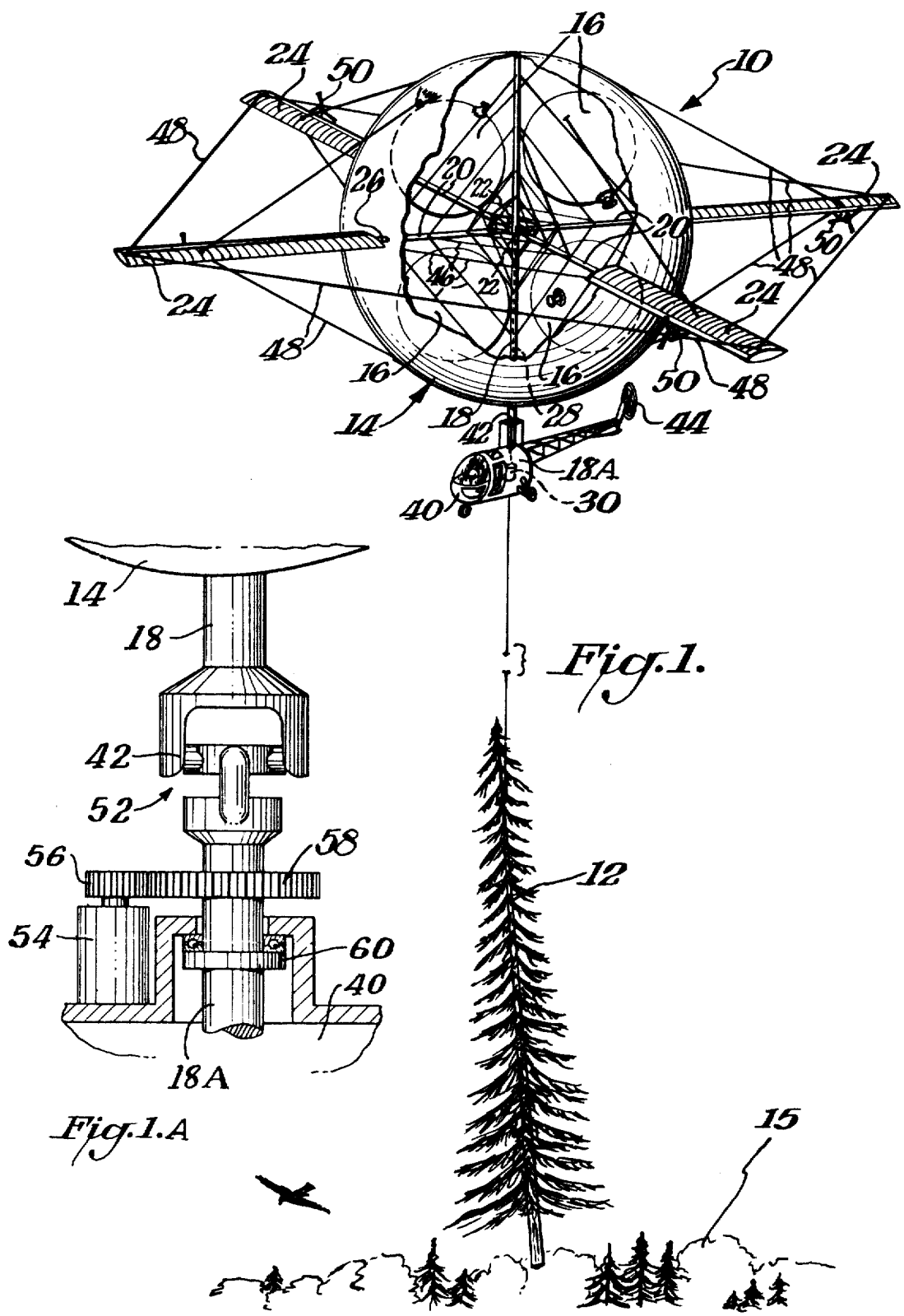

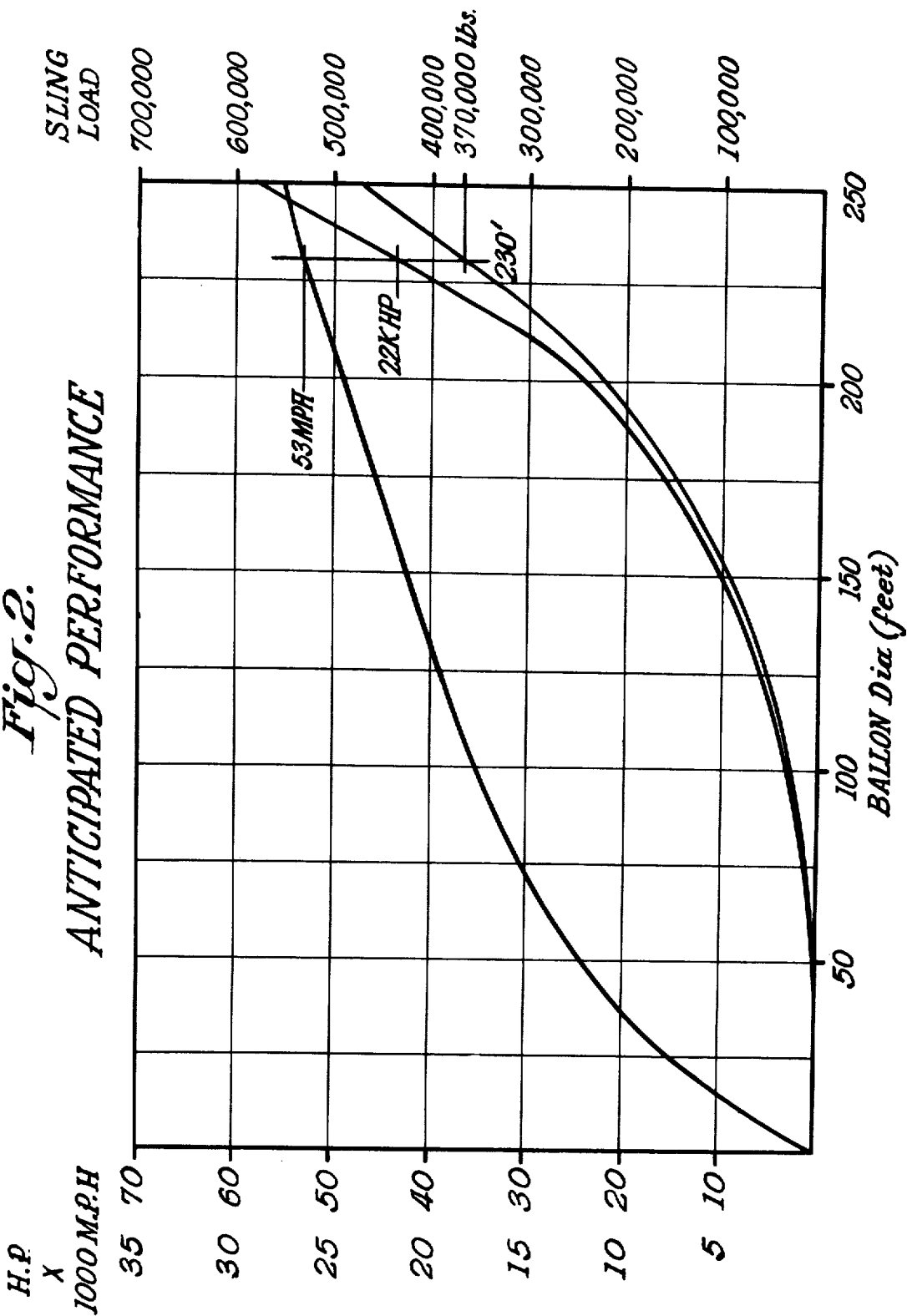

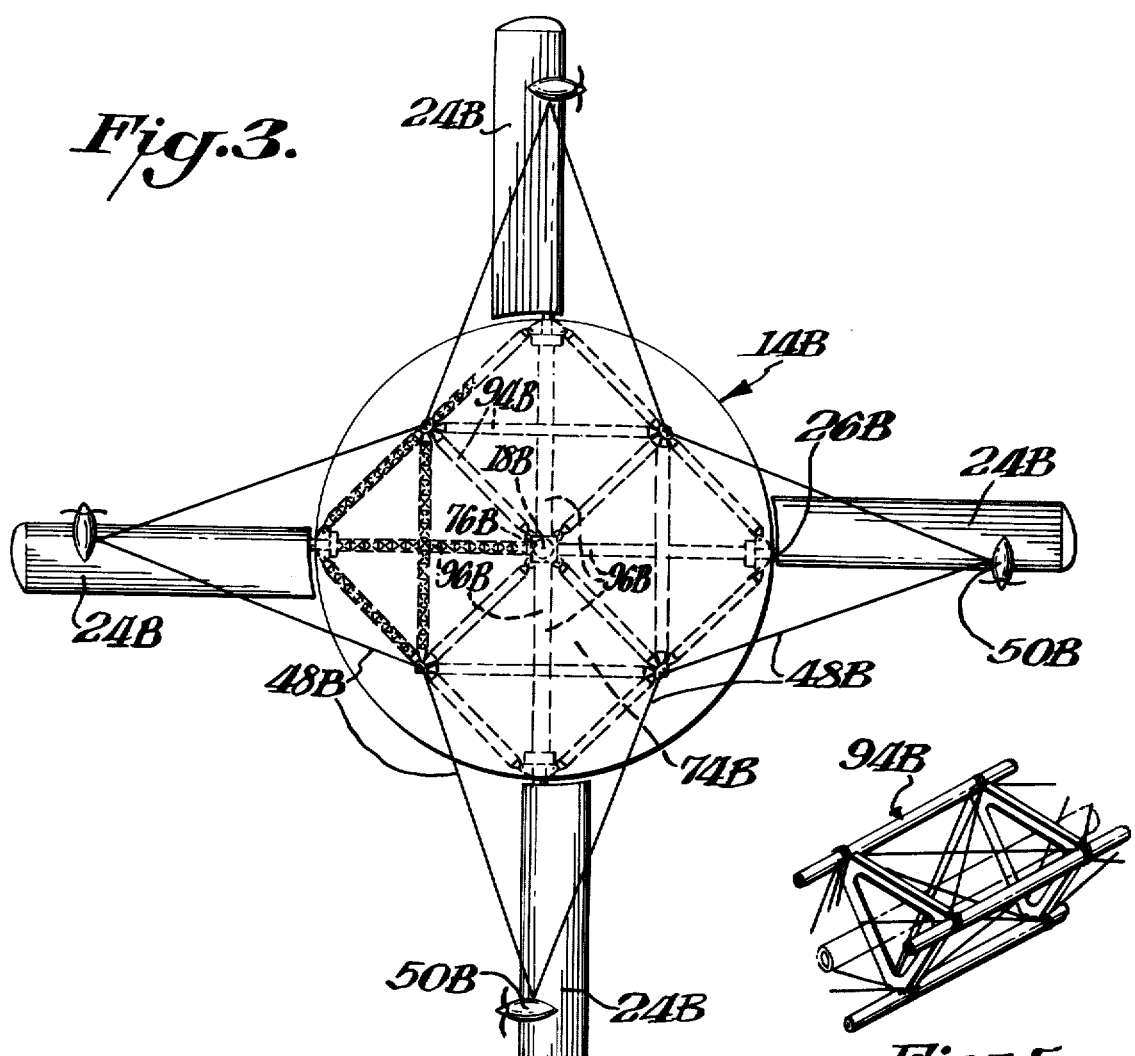
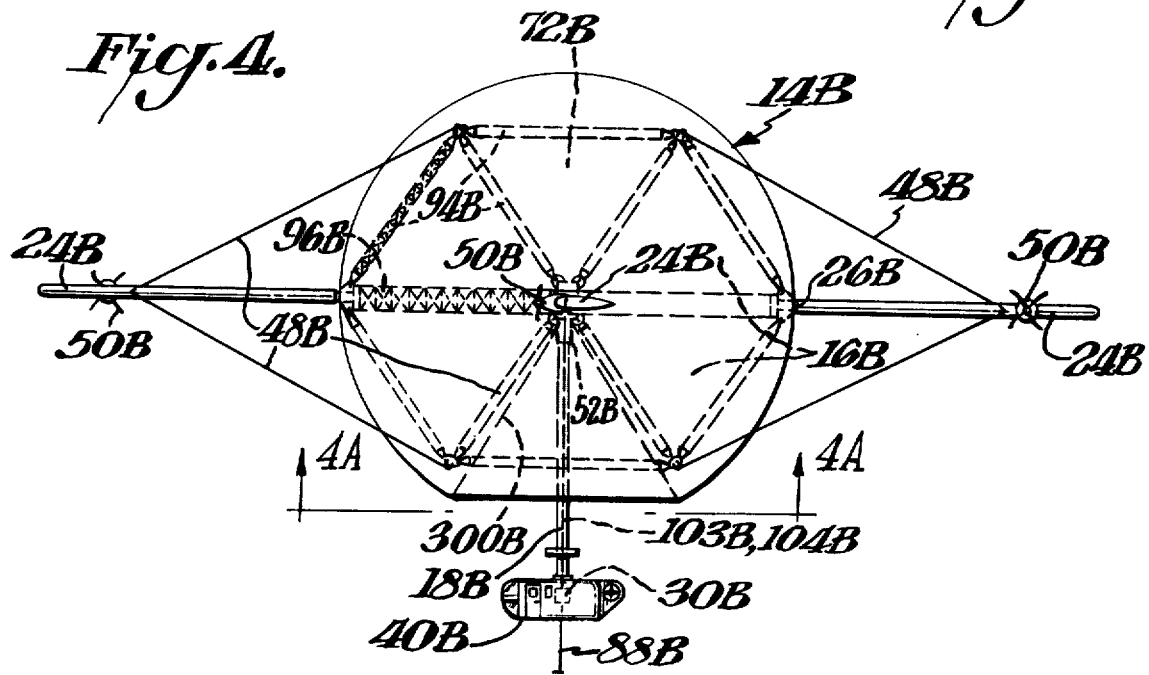

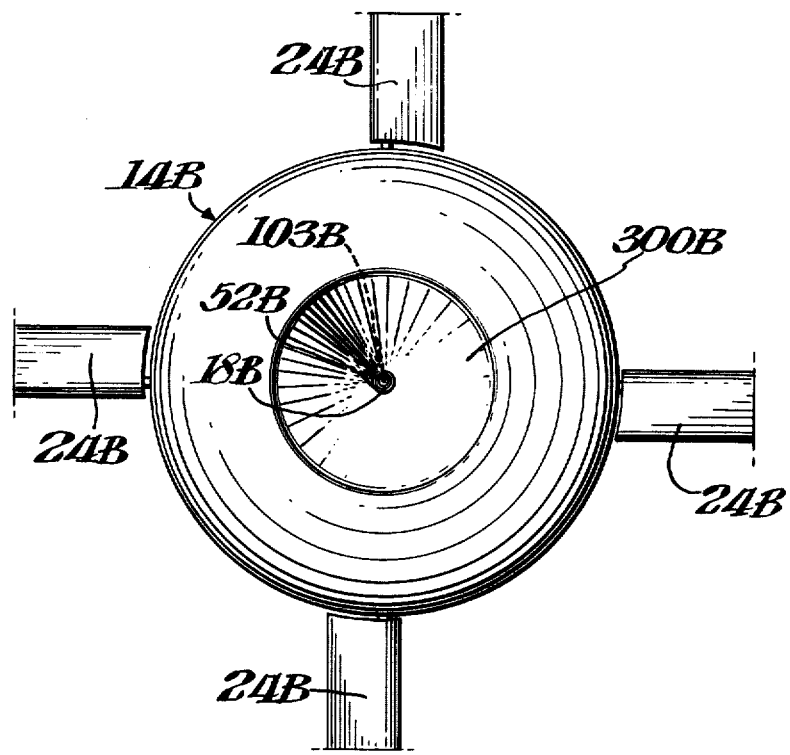

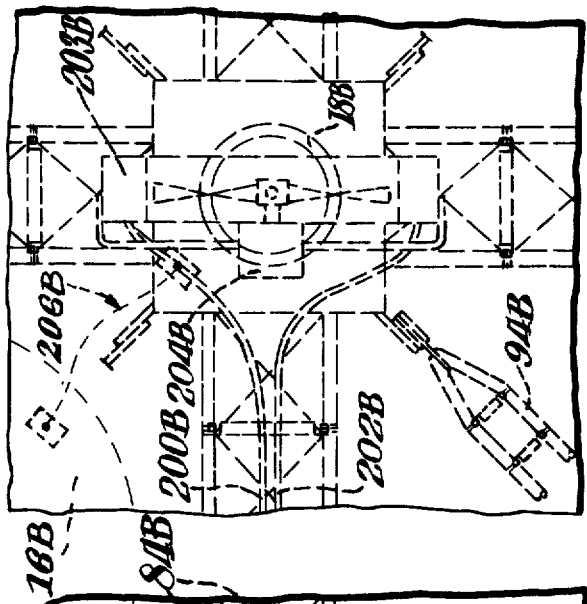
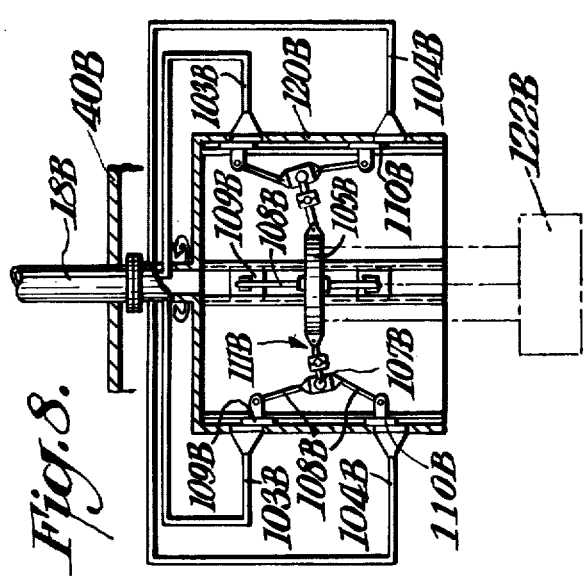
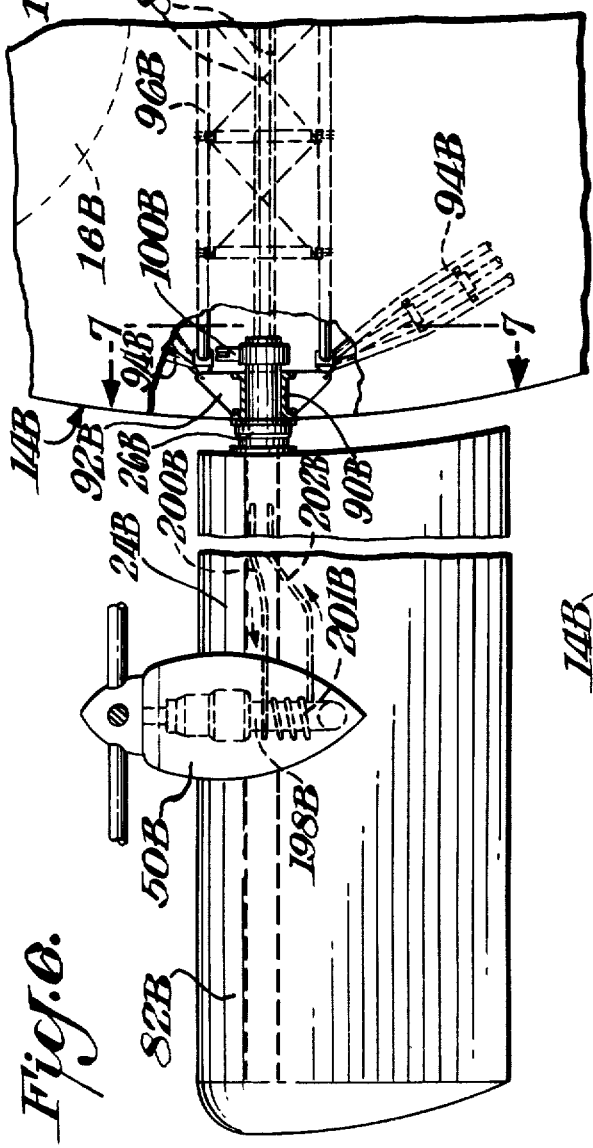
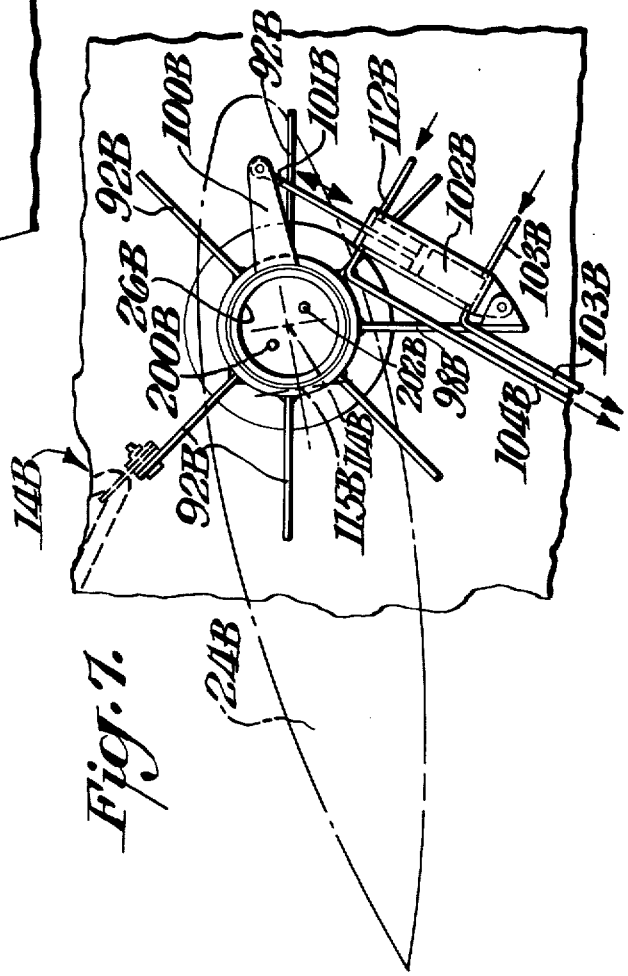

SEMIBUOYANT COMPOSITE AIRCRAFT

CROSS-REFERENCE TO RELATED APPLICATIONS, IF ANY

This application is a continuation-in-part of copending commonly assigned application for U.S. Letters Patent Ser. No. 357,636, filed May 7, 1973, by this same inventor, issuing as U.S. Pat. No. 3,856,236.

BACKGROUND OF THE INVENTION

A composite aircraft capable of lifting and transporting extremely heavy weights over limited distances at relatively slow speed is described in U.S. Pat. No. 3,856,236. Heavy wind gusts interfere with the flight of such an aircraft and temperature variations vary the lifting effect of the lighter-than-air gas. The control console slung below the bottom of the lifting sphere is also subject to disruptive periodic swinging. An object of this invention is to provide a stable control and rigging for such a composite aircraft.

SUMMARY

In accordance with this invention the control system for adjusting the angle of attack of the wings is of the lift command type, which establishes a desired aerodynamic force to be obtained from each wing. If the wing experiences a gust, the change in aerodynamic force compels the wing to seek a different angle of attack for regaining the predetermined force commanded by the control system. A pneumatic lift command control system controls the angle of attack through a pneumatic cylinder and piston drive whose position is controlled by valving actuated by a helicopter swash plate control. The valving may rotate with the balloon chamber and extend into the control console. The stability of the aircraft is enhanced by a strong girder network emanating substantially from the center of the balloon chamber which has a tapered bottom indentation extending substantially to its center. The console is attached substantially to the center of the chamber by a long suspension beam and a rotatable joint. The long effective suspension for the console from the relatively stable center of the balloon chamber minimizes periodic swaying motion of the console. The lifting force of the ligher-than-air gas in the balloon chamber is efficiently controlled by applying controlled heat to the gas from the propulsion engines.

BRIEF DESCRIPTION OF THE DRAWINGS

Novel features and advantages of the present invention will become apparent to one skilled in the art from a reading of the following description in conjunction with the accompanying drawings wherein similar reference characters refer to similar parts and in which:

FIG. 1 is a pictorial view partially broken away of one embodiment of this invention lifting an entire tree from a forest;

FIG. 1A is an enlarged view in elevation of the suspension between balloon chamber and cab of the embodiment shown in FIG. 1;

FIG. 2 is a theoretical diagram of lateral speed and load capacities of the embodiment shown in FIG. 1;

FIG. 3 is a top plan view of another composite aircraft which is another embodiment of this invention;

FIG. 4 is a front view in elevation of the composite aircraft shown in FIG. 3;

FIG. 4A is a cross-sectional view taken through FIG. 4 along the line 4A—4A;

FIG. 5 is a three-dimensional view of one of the girders of the composite aircraft shown in FIGS. 3 and 4;

FIG. 6 is a top plan view of wing and partial portions of the balloon chamber of the composite aircraft shown in FIGS. 3 and 4;

FIG. 7 is a cross-sectional view taken through FIG. 6 along the line 7—7; and

FIG. 8 is a cross-sectional view in elevation taken through a portion of the control console of the aircraft shown in FIGS. 3 and 4.

DESCRIPTION OF THE PREFERRED EMBODIMENTS (FIGS. 1, 1A and 2)

In FIG. 1 is shown a composite aircraft 10, lifting and transporting an extremely heavy tree 12, directly from forest 15. The ability of aircraft 10 to lift and transport a complete untrimmed tree, branches and all, makes it possible to selectively pluck large trees from the midst of a forest without cutting erosion promoting roads and swaths through the forests.

Aircraft 10 includes a large balloon chamber 14 containing within balloonettes 16 a light-than-air gas such as helium. Chamber 14 is distended in substantially spherical shape by a slight air pressure provided by a blower or compressor (not shown). Chamber 14 can also be comprised of a single teardrop shaped balloon configuration, but the spherical form reduces drag and facilitates maneuvering. The outer skin of spherical chamber 14 is for example made of a relatively strong fabric, such as nylon. Balloonettes 16 are for example made of an elastomer coated Dacron or of Mylar film. Dacron is the trademark of E. I. du Pont de Nemours & Co. of Wilmington, Delaware for a synthetic fiber made by the combination of dimethyl terephthalate and ethylene glycol. Mylar is the trademark of the aforementioned company for a highly durable, transparent water repellent fiber of polyethylene terephthalate resin. Balloonettes 16 are inflated to slightly less than full spherical volume, such as 90% thereof, to allow for temperature and pressure fluctuation.

A strong mast 18 of structural material such as steel or duralumin is mounted within chamber 14 at its vertical axis. Wing spars 20 are joined by connectors 22 to the middle of mast 18 for supporting the four (4) wings 24 which extend substantially horizontally about chamber 14. Rotatable couplings 26 connect wings 24 to spars 20 to permit their angle of attack to be adjusted for individually varying their lift. Control of the angle of attack is provided by a linkage diagramatically illustrated by broken lines 28 within the interiors of mast 18 and spars 20. This control is actuated by a helicopter-type cyclical control diagramatically illustrated by block 30 in control console 40, which is hung by a swivel bearing 42 below the bottom of mast 18 extending below chamber 14. Swivel bearing 42 may also be described as a rotatable or universal joint 42. The cyclical control is, for example, as described in *Aerodynamics of the Helicopter* by Alfred Gessow and Garry C. Myers, Jr. published by the Frederick Ungar Publishing Co., New York, New York, U.S.A., Copyright 1952 and republished 1967, pages 22–28, or *Helicopter Engineering* by Raymond A. Young, published by the Ronald Press Company, New York, Copyright 1949, pages 8–13.

Control console 40 is for example the cabin and gyroscopic stabilizer 44 a of helicopter, less the propulsion engines and rotor blades. Wings 24 are supported against upward and downward reaction forces by a series of guy wires 46 connecting spars 20 to mast 18 within balloon chamber 14. The external wings 24 are also supported by guy wires 48 extending outside of balloon chamber 14. The relatively slow linear speed of wings 24 minimizes the drag caused by outer guy wires 48 and makes it insignificant.

Thrust motors 50, such as turboprop engines, are mounted on wings 24 for rotating them about mast 18 and the vertical axis of rotation of aircraft 10. Turboprop engines are advantageous for this service because of their smooth dependable and reliable operating characteristics with relatively good fuel economy and efficient aerodynamic performance.

Aircraft 10 (without a sling load) is at all times buoyant and landing involves mooring. As the size increases, the maximum wind in which the vehicle can be moored simply by a single point at the bottom of the control cab or by its lifting sling increases. All vehicles large enough to be of economic value (i.e., over 20,000 lbs. sling load) can be moored in this fashion in all normal wind conditions (i.e. up to 20–40 mph depending on size). For conditions beyond the single point mooring capability, facilities must be prepared for by more complicated mooring systems. Unlike an airship which requires swinging room, the spherical aircraft is nondirectional, but is also consequently of higher drag. It appears, however, that it should be in general much easier to handle and moor because of its nondirectional characteristics.

Ferrying over long distances does not appear practical and it would probably be better in small sizes to knock down and ship. A trip of a few hundred miles could be made with proper attention to weather. The problem is not endurance of the vehicle but endurance of the crew since it would be possible to sling carry fuel for many hours (possibly days) flight. In all uses there will be wind conditions where flight operations should be studied in detail for each proposed use.

One limitation of aircraft 10 may be its inability to operate when the load is exactly equal to the aerostatic lift. Under this condition the vehicle is neutrally buoyant and there is no aerodynamic thrust available to be vectored for translation unless the thrust vector is made parallel to the earth. Making the balloon-rotor rotate 90° does not seem practical for most operations. Uses which involve a loaded trip in on direction and an empty trip back, or fully loaded in both directions are more suitable to the flight characteristics of the aircraft 10. Some thought has been given to the possibility of vertical tacking if forced to operate with load equal to aerostatic lift. In this mode the vehicle would climb (i.e. at 45°) and the drag would provide force for the rotor to work against. Then when halfway to destination, a corresponding descent would be undertaken. Difficulty would still be encountered in holding a hovering station in a wind. This condition would, therefore, probably be amended by adjustment of static lifting force.

Because of the required size of the central balloon dictated by the static lift required, forward speed of the aircraft will be quite limited as compared with the conventional helicopter. This fact limits this vehicle to missions where efficient static lifting ability is of prime importance and translation velocity is secondary. However, since ability to operate under reasonable wind conditions must be considered, speeds of 30 to 50 mph are considered as essential to achieve an economically useful heavy lifter. Since the balloon chambers will be the major source of aerodynamic drag, the $C_D$ of this structure is the major factor in achieving acceptable translational flight performance. Theoretical speeds and load capabilities of aircraft 10 are described in FIG. 2.

The control cab and load sling are attached at the south pole by a suspension 52 including a self-aligning bearing which will allow the cab to stay stationary under the influence of a tail rotor stabilizer 44 as the balloon and blades rotate, and allow the sling tension member to remain vertical as the balloon and blades tilt to achieve translation. A spherical roller bearing may be used here if it has sufficient angular tolerance i.e. 20 to 30%. A suspension 52 including motor 54 and spurgear 56 mounted fixed in torque on the control cab 40 and a ring gear 58 on the balloon chamber 14 through universal joint 42 would allow the operator to retain the fixed cab heading without using tail rotor 44 as the balloon rotates above. Motor 54 drives spurgear 56 and cab 40 about ring gear 58 through rotating bearing 60 which angularly insolates balloon chamber mast 18 from helicopter support mast 18A.

Slip rings, and possibly rotatable couplings for air and/or hydraulics will be required to transmit control signals from cab to balloon-rotor. Reliability and redundancy in the detail design of this feature will be extremely important.

Fuel will be carried in the lower part of cab to obtain as much statically stable moment as possible during unloaded flight.

Excessive static stability during loaded flight caused by the sling load - buoyant force couple may be a control problem but preliminary calculations show it to be solvable by cyclic pitch control fore and aft with the sling attached at the south pole. If the performance penalty for this control proves too great, the structural penalty of moving the slings and cab self-aligning joint toward the center of the sphere can be investigated.

The sling itself is a relatively simple tension member with hooks, releases, grabbers, etc., dictated by the use of the vehicle and will not be treated in detail herein.

The outer skin of the balloon is pressurized with an air blower to maintan a small pressure differential to maintain the shape of the sphere against any expected dynamic pressure. The balloonettes are inflated to less than full spherical volume (assumed 0.9 in performance calculations) to allow for variation due to temperature and altitude.

Aircraft 10 offers several interesting safety features compared to a conventional helicopter. Since the entire structure is buoyant with the "hold down" load being the sling cargo or in the absence of cargo the negative lift of the rotor, loss of power results in falling up. When loaded, aircraft 10 has such a light disc loading that autorotative descent is at parachute values, allowing a machine fully loaded to land its cargo and remain attached to it, as an anchor. However, since aircraft 10 is multi-engined and since the full load hover power is less than half of that needed to assure a reasonable cruising speed, there is little chance of the requirement for a power off descent or danger of uncontrolled ascent. Features for gas valving could be incorporated but are not considered essential for a multi-engined machine and might upon analysis be of more hazard than good. Because of size, direct control for both collective cyclic pitch does not seem to be practical, therefore, care in design and sufficient redundancy in the power pitch controls must be incorporated. The lifting gas in separate balloonettes (eight for a four wing system) gives good redundant safety in this area. The excellent apparent protection against this machine falling should be of special interest in operation in forest areas where fire is a great hazard and in populated areas.

On the negative side, the limited speed of aircraft 10 makes operation in high winds a problem and possibly hazardous. Dropping of sling cargo as a safety measure in remote areas should be considered, but with all other redundancies of the vehicle, there is little probability this will be required.

Operation of engines under moderate G's does not appear to be a serious problem. Both turboprop and reciprocating engines should not have any major problem at 10 g or under. Centrifugal acceleration can be kept as low as 5g if required without compromising the performance seriously. In the final analysis, a qualification run on a centrifuge arm can be made to proof test the engine selected under actual G conditions.

The propeller should be of a constant speed variable pitch type and should be capable of responding to the cyclic variation in airspeed. Size will be larger than normal for aircraft because of low blade speed. Stresses on propeller, gear box and turbine rotor due to gyroscopic moments will have to be considered. Effect of cross winds due to horizontal speed must also be considered in propeller design if a serious problem should develop. The engine and prop could be mounted with a vertical and horizontal tail to hold the thrust line directly into the relative wind.

Due to location of the center of buoyancy above the center of gravity, aircraft 10 will with collective lift control only be capable of vertical ascent and descent and is statically stable in this mode. The static stability will vary widely depending on the sling load since this load is conveniently slung from the south pole of the sphere even without a sling load. However, the weight of the control cab, sling and fuel will keep the vehicle statically stable. Assuming for a 30,000 lbs. sling load vehicle, the control cab sling and fuel wieght 5,000 lbs, the unloaded static stability is 14% of the loaded stability.

In order to achieve other than vertical flight, a cyclic lift control as previously discussed must be utilized to overcome the static stability and cause the balloon and wing to tilt in the direction of desired horizontal motion. As the aircraft translates, differences in the lift distribution on the advancing and retreating wings will in spite of equalized lift cause unequal moment about the balloon center with resultant lateral tilt. This must be compensated for by some lateral as well as fore and aft cyclic lift control.

A standard helicopter type control stick controlling the tilt of the balloon rotor by cyclic lift control is provided along with a normal collective lift lever. Engine power is automatically adjusted by centrifugal force to maintain a constant (or if desired, adjustable) rotor angular velocity.

In order to provide the lift control moments to angularly adjust the wings, an air system is utilized with compressor bleed from the engines if available or separate low pressure pumps on each engine if not. Flow from each engine is piped to a central manifold and from there to the control cab through a rotating valve system at the cab-balloon rotating joint. This may be either full flow or a servo flow depending on size of the vehicle and control power requirements. Direct operation is desired for reliability. Electrical operation of servo valves could also be used with slip rings replacing the rotary valve system at the rotating joint.

The cyclic lift control will be connected to a fore and aft and an athwartship control valve. The fore and aft valve is operated by sidewise movement of the cyclic lift control and controls lift in the right and left semicircles of the rotor wings.

For an aircraft 10 capable of transporting a 100,000 lb. payload, four blades would be used on a balloon approximately 150 ft. in diameter. Each blade (actually a symmetrical aircraft wing of completely standard construction) is approximately 125 ft. long by 18 ft. wide and mounts a turboprop engine.

Rotational speed of aircraft 10 in this 100,000 lb payload configuration is about 10 RPM. This will produce a maximum g load of 6.2 at the tip of the wing, with considerable lower and fully acceptable G forces experienced by the engines. Forward speed will be in the neighborhood of 35 to 40 MPH using a maximum of 5,000 horespower without the use of boundary layer control (BLC) on the sphere.

(FIGS. 3–8)

Aircraft 10B shown in FIGS. 3–6 is for example, designed to carry a 55 ton useful load. It includes a central sphere 14B approximately 150 feet in diameter (the exact size depends on the actual weight of the final design) and four equatorially mounted, externally supported wings 24B with turboprop engines 50B mounted thereon. The control console or cab 40B and load 12B (not shown) are suspended from the center of the sphere through a tapered or cone-shaped lower access indentation 300B.

Control is for example, by cyclic and collective actuation of the rotating wings. Cyclic command permits an axial tilt of plus or minus 30° for 360° vectorable thrust. Wing configuration and power selection may provide for example, support of 54 percent of the sling load plus a thrust component for vehicle translation. The remaining 46 percent of payload support plus all structural weight and fuel is carried by the aerostatic lift generated by the contained helium.

Aircraft 10B involves the integration of a very large tip-driven helicopter rotor with an aerostatically buoyant centerbody. Since the rotor is very lightly loaded (about 0.6 lb/sq. ft. of disc) and has low tip speed (about 200 ft./sec.), centrifugal forces are not a significant factor in the structural support of the rotor. The low rotor speed, however, allows the use of a braced wing structure without significant power penalty, and the large spherical buoyant center section provides space for a deep cabane section without aerodynamic penalty providing struts to which brace wires can be extended to support the wings in both the axial and equatorial direction.

Except for torsional requirements for wing cyclic control, and resistance to the propeller and engine gyroscopic moments, the center section structure is one of pin-ended compression and tension members providing a polygonal girder framework 70B having twelve triangular sections 72B on its sides and two square sections 74B on top. In addition to acting to carry through the wing load, the center structure provides focal points for the aerostatic buoyancy and the slingload.

FIG. 3 shows a top view and FIG. 4 a side view of the structure. Struts or girders 94B and 96B respectively have triangular and square cross sections. The struts consist of tubes 80B spaced far enough apart to provide column stability and sufficient interbracing to break the tubes into short enough sections to prevent local column failures. Wing 24B consists of a box spar center section 82B about 3½ ft. square which resist column bending, shear and torsion loads.

Power plants 50B are mounted on spar 82B at approximately 75% of the wingspan from the root 26B in a normal manner, except for the requirement to resist centrifugal and gyroscopic forces. The service lines 84B including fuel supply lines, hydraulic, pneumatic and electric lines, engine and propeller controls, and instrumentation leads, pass through girder 96B wing to the root where they pass through flex joints 86B into the center section.

FIG. 4 shows the slingload and cab suspended near the sphere center. Universal joint 42B is provided at the suspension point to allow the load-cab suspension tube 18B angular freedom as the balloon and wings rotate. All controls and instrumentation pass through or around this joint. The center section above this point contains the APU's for auxiliary power, and any gyrostabilized reference which may be required for control.

The control cab 40B and load 12B (not shown) are attached to the lower end of suspension tube 18B. Cab 40B is mounted on bearing 50B around the tube and its azimuth is controlled by a tail rotor system 44B. A tail rotor is used in preference to a direct retro-drive (such as 54, 56 and 58 of FIG. 1A) to the support tube to avoid the uneven angular motion of the universal joint from being transmitted to the cab. A retro-drive 54B, 56B and 58 provides a redundant cab antturn system, since upon any tail rotor failure, the cab can be attached to the load anti-rotation system, (not shown).

The operator's position must allow maximum visibility downward and forward, and may allow for swivelling of the control position or a second operating position with a view of the load. The cab can also be equipped with a hoist system 88B for access from the ground and an egress on the top with a hoist system to allow personnel to enter the center section of the sphere, and access from there to all other areas requiring maintenance. The control cab may also have a head, galley and bunks for off-duty crew and ferry missions.

Stability is the basic reason for attachment of the load to the center of aircraft 10B rather than at the edge. Computer analysis indicates that there is essentially no oscillating motion for center attachment while a period between 10 to 13 seconds could occur for edge attachment of the load. Assuming a 50 ton slingload aircraft with an advance ratio (i.e., the ratio of wing rotational velocity to forward velocity of the aircraft) of 0.2, analysis indicates that the period of induced oscilation due to vehicle dynamics would be 2.4 seconds if the slingload were attached at the edge while the period would be 137.9 seconds if the load were attached at the center. While a 2.41 second time (11.38 second period) is well within the response time of the pilot, center attachment does offer levels of basic stability unheard of in any rotor system previously known, reflecting the result of a common center of buoyant lift, rotor thrust vector and load attachment.

Control of aircraft 10B involve the need for a balance of aerodynamic lift forces from the rotating wing system as established by pilot command. In the final analysis, the ideal control command would be a signal establishing the desired quantity of aerodynamic force from a given wing. This may be accomplished through a wing angle of attack/force servo-system (later described) or by means of a more direct system as disclosed herein as the "lift command system".

The rigid wings required and the lack of high centrifugal forces make the normal cyclic pitch control such as used in helicopters impractical possibly because of the high load factors which would be required on the wings due to gust loads. Use of cyclic lift control could reduce the required gust load factors and result in a saving in structural weight. The control system proposed for aircraft 10 is therefore "Lift-Control" rather than pitch control of the conventional helicopter. Each wing is pivoted on a spanwise hinge ahead of the aerodynamic center of the symmetrical wing section. The control system provides the torque to resist the tendency of the wing to trail at zero lift. The lift on each blade will then be a linear function of this torque.

$$L = KT$$

Application of an equal torque to each blade (wing) is by collective lift control (corresponding to collective pitch control for conventional helicopter).

A symmetrical airfoil is preferred as the aerodynamic thrust of the rotating wing system must be both positive and negative (loaded and unloaded flight) and it is desirable to maintain a constant center of pressure of the wing for required changes in angle of attack. In the lift command system a symmetrical airfoil is used (but non-symmetrical airfoils can also be used) with the wings free to revolve about a hinge point 114B forward of the aerodynamic center 115B as shown in FIG. 7. A pitch horn 100B is attached to the wing so that a force applied to the pitch horn 100B would cause rotation of the wing 24B about the hinge point center line 114B. With no force applied to the pitch horn, any airflow over the wing would not generate a moment (neglecting wing weight) and the wing would be in a trailing position. In the lift command system a force is applied to the pitch horn proportionate to the amount of lift required from the wing. The wing angle of attack is determined from this force requirement rather than the normal method of control that selects an angle of attack and accepts the force thereby generated.

In the illustrated form of the invention, an air cylinder 102B contains a piston with rod 101B connected to pitch horn 100B. If a positive thrust is required from each wing 24B, then air is supplied through port 103B. The actual pressure experienced by the piston and transmitted through the rod 101B to pitch horn 100B is a function of the quantity of air allowed to flow through duct 104B.

FIG. 8 schematically illustrates the swash plate control assembly that is physically in the cab 40B of aircraft 10B. Swash plate 105B (actuated by control input 122B) maintains a fixed orientation to control cab 40B while linkage 107B, 108B, and port valves 109B and 110B are free to rotate on extension cylinder 120B with the sphere wing assembly 24B by reason of isolation bearing assembly 111B. Four valves 109B and 110B (two for each wing) are provided at 90° intervals around cylinder 120B.

In the position shown in FIGS. 7 and 8, valve 109B is controlling the flow of air from duct 103B. Duct 104B is the bleed air duct that controls the force of the incoming air from port 103B that is being applied to the rod 101B. Complete blockage of duct 103B by valve 109B applies the full force of the air entering port 103B to rod 101B and thus commands a maximum aerodynamic lift from wing 24B. If swash plate motion moved valve 109B completely away from the opening of duct 103B, no pressure exists in cylinder 102B and the wing is in the trail position.

Application of air to port 112B changes the action of the system to permit valve 110B to act on the port of duct 104B, an extension of tube 104B, for control of the vehicle in unloaded flight. Under these conditions, the air supply is shut off port 103B and instead applied to port 112B of cylinder 102B. Thus a downward force is applied to rod 101B through the action of swash plate 105B through valve 110B.

Movements of valves 109B are 180 degrees out of phase for similar movements of swash plate 105B, i.e., a downward movement of swash plate 105B tends to close ports 104B, and while the same downward movement of swash plate 105B opens ports 103B. This reversal is exactly the desired condition to permit pilot commands to provide similar vehicle movements in loaded or unloaded flight.

In the operation of the system, cyclic or collective commands establish a desired force for each wing. If the wing experiences a gust, the changed aerodynamically generated force compels the wing to seek a different angle of attack to keep the new force in balance with the command force exerted by rod 101B through the pitch horn 100B. Thus, gust alleviation is a built-in feature of the system. While the pneumatic system shown is deemed desirable, the same effect can be achieved with suitable electrical or hydraulic systems.

Another basic approach to a command thrust control system is to: (1) sense the thrust of each wing as a force being applied through the wing support points, (2) compare this force to the computed force required based on the control command at that time, and (3) activate a servo loop to change the angle of attack of the vane to provide the required force. Forces developed by gusts would be quickly balanced to the desired level by the servo loop angle of attack command. This "fly-by-wire" control system is well within the state of the art and reduces the need for system coordination by the pilot. Signals from automatic ground station positioning equipment could be easily accepted by this class of control system.

The normal method of compensating for pressure variations in aerostatically buoyant vehicles is through the use of a ballonet system wherein a small flexible container of air is maintained within the main envelope containing the buoyant gas. As the vehicle changes altitude or experiences temperature variations, the change in pressure of the buoyant gas is allowed to modulate the volume of the balloonet by forcing air out of the ballonet or requiring the insertion of air.

In aircraft 10B, the engines producing considerable quantities of heat are used to maintain a constant temperature of the buoyant gas by means of temperature control 206B. As a constant temperature is maintained above the maximum expected temperature that would be produced by external environmental forces, e.g., solar heating or atmospheric heating, the pressure of the gas remains constant except for altitude variations.

Examination of altitude pressure differentials discloses that envelope elongation will be in the neighborhood of one percent per 1,000 feet of altitude change. Careful selection of envelope material will permit this amount of elongation to be accepted within the design specifications of the material.

This system is in sharp contrast to other thermally controlled systems in that the heating of the gas to a constant temperature precludes a volume change (due to external temperature variations) and, therefore, does not basically affect the buoyancy of the system.

The advantages of this approach include the elimination of the weight and cost of the balloonet system as well as the ability to modulate the temperature for programmed changes in altitude as might be required in long-range transport of the vehicle.

During periods of inactivity when the engines would not be operating, the tiedown area could include helium storage to maintain pressure in the envelope as the temperature drops due to lack of continued heat from the engines. Thus the craft would retain structural integrity while moored to resist wind loadings.

The method of collecting waste heat from a gas turbine engine is shown in FIG. 6. The engine 50B is fitted with a tube around which is coiled a fluid filled tube assembly 201B. Engine exhaust heats the fluid and this fluid is circulated through pipes 200B and 202B under the influence of temperature control 206B. At the center of the vehicle, a heat exchange system consisting of a radiator 203B and fan 204B transfer the heat of the fluid to the helium.

Boundary layer control can be used to overcome the Magnus effect and thereby reduce the drag of the sphere. One method would be to provide for injection of air into the boundary layer on the advancing hemisphere. This could be accomplished by sequentially supplying air at adequate volume and pressure to ports located on the skin of the sphere with provisions for deflecting this air into the boundary layer counter to the circulation induced by sphere rotation. The result would be to accelerate the air on the advancing side of the sphere to a velocity comparable to the air on the retreating side of the sphere.

A drag reduction envelope can eliminate any possible drag due to Magnus forces. An external shield can be attached in the form of two hemispheres of fabric attached to the main sphere near the equator by means of a roller bearing system or a "zipper" technique that will allow a relative rotation between the sphere/wing assembly and the external shield. The external shield would be driven so as to present a non-rotating surface to the air stream.

While the spherical centerbody has the advantage of simplicity, there are alternate configurations that offer performance improvements. If the centerbody is flattened at the poles into an oblate spheroid and a propulsion system provided (such as aux. engines mounted on top and/or bottom, or cycloidal propulsion vanes on the wings such as shown in U.S. Pat. No. 3,166,129) that did not demand equatorial tilt to supply a horizontal thrust vector component, then the overall drag of the system would be substantially reduced permitting higher speeds and/or increased efficiency.

For long range missions where the payload (oil, grain etc.) could be carried at the center of gravity of the sphere, a cone-shaped inflatable section could be added onto the lower hemisphere and the axis of the vehicle at or near neutral buoyancy could be horizontal with the rotating wing system acting as a propeller. In this mode, collective wing control would establish overall propulsion efficiency and speed while cyclic wing control would provide directional control.

I claim:

1. A composite aircraft comprising a large balloon chamber containing a lighter-than-air gas which provides a large static lifting force having a magnitude substantially greater than the weight of said aircraft, said aircraft having a substantially vertical axis, a set of substantially horizontally disposed wings extending radially relative to said vertical axis, a structural assembly connected to said aircraft at said vertical axis for supporting said wings in a substantially horizontal radial array relative to said aircraft, rotatable coupling means connecting said wings to said structural assembly and permitting adjustment of the effective angle of attack of said wings, thrust means mounted upon said wings whereby said wings and chamber are rotated about said axis, control means connected to said wings for varying their effective angle of attack to either provide a dynamic lifting force for augmenting said static lifting force whereby said combined static and dynamic lifting forces are sufficient to lift large weights or to provide a strong negative dynamic lift for overcoming said static lift and moving said aircraft towards the ground, said control means comprising a lift command control system, said lift command control system being constructed and arranged to adjust the effective angle of attack of said wings to obtain a predetermined aerodynamic force, said structural assembly comprising a girder network emanating substantially from the center of said balloon chamber, an indentation in the bottom of said balloon chamber having its apex disposed substantially at the center of said balloon chamber, a control console being disposed below said balloon chamber, rotatable joint means connecting said control console substantially to the center of said girder network, a stabilizing device being connected to said control console for preventing it from rotating with said balloon chamber, heating means in said balloon chamber for controlling the temperature and lifting force of said lighter-than-air gas in said chamber and temperature control means connected to said heating means for controlling the internal pressure of said aircraft.

2. A composite aircraft comprising a large balloon chamber containing a lighter-than-air gas which provides a large static lifting force having a magnitude substantially greater than the weight of said aircraft, said aircraft having a substantially vertical axis, a set of substantially horizontally disposed wings extending radially relative to said vertical axis, a structural assembly connected to said aircraft at said vertical axis for supporting said wings in a substantially horizontal radial array relative to said aircraft, rotatable coupling means connecting said wings to said structural assembly and permitting adjustment of the effective angle of attack of said wings, thrust means mounted upon said wings whereby said wings and chamber are rotated about said axis, control means connected to said wings for varying their effective angle of attack to either provide a dynamic lifting force for augmenting said static lifting force whereby said combined static and dynamic lifting forces are sufficient to lift large weight or to provide a strong negative dynamic lift for overcoming said static lift and moving said aircraft towards the ground, said control means comprising a lift command control system, and said lift command control system being constructed and arranged to predetermine an aerodynamic force and then to adjust the effective angle of attack of said wings to obtain and maintain said predetermined aerodynamic force.

3. A composite aircraft as set forth in claim 2 wherein said lift command control system comprises a pneumatic system.

4. A composite aircraft comprising a large balloon chamber containing a lighter-than-air gas which provides a large static lifting force having a magnitude substantially greater than the weight of said aircraft, said aircraft having a substantially vertical axis, a set of substantially horizontally disposed wings extending radially relative to said vertical axis, a structural assembly connected to said aircraft at said vertical axis for supporting said wings in a substantially horizontal radial array relative to said aircraft, rotatable coupling means connecting said wings to said structural assembly and permitting adjustment of the effective angle of attack of said wings, thrust means mounted upon said wings whereby said wings and chamber are rotated about said axis, control means connected to said wings for varying their effective angle of attack to either provide a dynamic lifting force for augmenting said static lifting force whereby said combined static and dynamic lifting forces are sufficient to lift large weights or to provide a strong negative dynamic lift for overcoming said static lift and moving said aircraft towards the ground, said control means comprising a lift command control system, and said lift command control system being constructed and arranged to adjust the effective angle of attack of said wings to obtain a predetermined aerodynamic force, said lift command control system comprises a pneumatic system, said pneumatic system comprises cylinder and piston assemblies reacting between said balloon chamber and said wing for adjusting their effective angle of attack, air bleed valves connected to said cylinder, a swash plate input control in said lift command control system, and a connecting linkage between said swash input control and said bleed valves for adjusting said angle of attack.

5. A composite aircraft as set forth in claim 4 wherein said air bleed valves are mounted on a ported cylinder connected to rotate with said balloon chamber.

6. A composite aircraft as set forth in claim 5 wherein said air bleed valves are rotatably isolated from said swash plate by a circular bearing.

7. A composite aircraft comprising a large balloon chamber containing a lighter-than-air gas which provides a large static lifting force having a magnitude substantially greater than the weight of said aircraft, said aircraft having a substantially vertical axis, a set of substantially horizontally disposed wings extending radially relative to said vertical axis, a structural assembly connected to said aircraft at said vertical axis for supporting said wings in a substantially horizontal radial array relative to said aircraft, rotatable coupling means connecting said wings to said structural assembly and permitting adjustment of the effective angle of attack of said wings, thrust means mounted upon said wings whereby said wings and chamber are rotated about said axis, control means connected to said wings for varying their effective angle of attack to either provide a dynamic lifting force for augmenting said static lifting force whereby said combined static and dynamic lifting forces are sufficient to lift large weights or to provide a strong negative dynamic lift for overcoming said static lift and moving said aircraft towards the ground, said structural assembly comprising a girder network emanating substantially from the center of said balloon chamber, an indentation in the bottom of said balloon chamber having its apex disposed substantially at the center of said balloon chamber, a control console being disposed below said balloon chamber, rotatable joint means connecting said control console substantially to the center of said girder network, and a stabilizing device being connected to said control console for preventing it from rotating with said balloon chamber.

8. A composite aircraft as set forth in claim 7 wherein said girder network comprises a substantially polygonal network.

* * * * *